United States Patent
Galka et al.

[19]

[11] Patent Number: 6,019,075
[45] Date of Patent: Feb. 1, 2000

[54] AIR AND FUEL DELIVERY SYSTEM FOR FUEL INJECTED ENGINES

[75] Inventors: William E. Galka, Caro, Mich.; Yukio Kitamura, Pasadena, Calif.

[73] Assignee: Walbro Corporation, Cass City, Mich.

[21] Appl. No.: 09/139,823

[22] Filed: Aug. 25, 1998

[51] Int. Cl.$^7$ .................................................. F02B 33/06
[52] U.S. Cl. ...................................... 123/70 R; 123/65 R
[58] Field of Search ................................ 123/70 R, 69 R, 123/68, 65 R, 71 R, 525, 560, 437, 444; 261/28, 38

[56] References Cited

U.S. PATENT DOCUMENTS

| | | | |
|---|---|---|---|
| 1,197,951 | 9/1916 | Pieper | 123/70 |
| 1,266,954 | 5/1918 | Kirk | 123/70 |
| 1,344,263 | 6/1920 | Crouse | 123/70 |
| 1,596,398 | 8/1926 | Burtnett | 123/70 |
| 1,609,792 | 12/1926 | Brock | 123/70 |
| 1,686,789 | 10/1928 | Belden | 123/70 |
| 1,988,082 | 1/1935 | Latta | 123/59 |
| 2,058,705 | 10/1936 | Maniscalco | 123/72 |
| 2,776,650 | 1/1957 | Zimmermann | 123/69 |
| 3,265,050 | 8/1966 | Tuckey | 123/437 |
| 3,734,069 | 5/1973 | Akiyama et al. | 123/65 R |
| 3,774,581 | 11/1973 | Lundy | 123/70 |
| 4,271,093 | 6/1981 | Kobayashi | 261/34 |
| 4,781,155 | 11/1988 | Brucker | 123/70 |
| 5,007,384 | 4/1991 | Blair | 123/48 |
| 5,033,418 | 7/1991 | Maissant et al. | 123/70 |
| 5,271,372 | 12/1993 | Nuti | 123/533 |
| 5,275,134 | 1/1994 | Springer | 123/42 |
| 5,785,015 | 7/1998 | Philippe et al. | 123/70 R |

*Primary Examiner*—Tony M. Argenbright
*Assistant Examiner*—Arnold Castro
*Attorney, Agent, or Firm*—Reising, Ethington, Barnes, Kisselle, Learman & McCulloch, P.C.

[57] ABSTRACT

An internal combustion engine has a fuel and air mixing device which utilizes an open bore venturi to draw fuel from the device and deliver a rich fuel and air mixture to a compressor driven by the engine for direct injection of the rich fuel and air mixture into the engine. An engine air throttle body uses an engine throttle linkage and valve to control air flow into the engine crankcase and provides a positive air pressure signal, especially at small throttle openings, to assist the metering of fuel within the fuel and air metering device. The positive air pressure signal is preferably provided by a small port in the engine air throttle body slightly downstream of the throttle valve when closed and is communicated with the fuel and air metering device to cause additional fuel to be delivered from the device. This positive air pressure signal enhances the quantity of fuel metered especially at engine idle and low engine speeds when there is a very low flow of air through the open bore venturi of the fuel and air metering device and hence a low pressure differential created therein and thus only a small amount of fuel would be drawn through the device by the air flow pressure differential.

14 Claims, 3 Drawing Sheets

AIR AND FUEL DELIVERY SYSTEM FOR FUEL INJECTED ENGINES

FIELD OF THE INVENTION

This invention relates generally to internal combustion engines and more particularly to a mechanical air and fuel mixing and delivery system for fuel injected internal combustion engines.

BACKGROUND OF THE INVENTION

Several non electronic and mechanical device based fuel delivery systems have been used to supply metered quantities of fuel and air to two-stroke, fuel injected, internal combustion engines. These systems have several benefits including reduced hydrocarbon exhaust emissions, improved fuel economy, a high level of reliability, and significantly lower cost than electronically controlled fuel and air delivery systems.

Conventional carburetors are often used within the mechanical fuel and air mixture and delivery systems to deliver the engines fuel requirements in the form of a fuel and air mixture. This fuel and air mixture is supplied to an auxiliary compressor for subsequent injection into the engine. However, most conventional carburetor designs utilize a throttle valve for venturi air flow control which adversely impacts compressor efficiency at low speeds, provides increased difficulty for precise calibration of fuel delivery and requires synchronized movement with the engine air valve requiring modification of the existing engine throttle linkage. A representative fuel system describing the use of a conventional carburetor in a mechanical mixture injection system is disclosed in U.S. Pat. No. 5,271,372 and European Patent No. EP 073449 A1. Further, some conventional carburetors use more than one fuel nozzle to deliver fuel from the carburetor in order to meter fuel delivery over the wide range of engine operating conditions.

SUMMARY OF THE INVENTION

A two stroke internal combustion engine has a fuel and air metering device which utilizes an unrestricted or an open bore venturi to draw fuel from the device and deliver a rich fuel and air mixture to a compressor driven by the engine for direct injection of the rich fuel and air mixture into the engine cylinder. An engine air throttle body uses a conventional engine throttle linkage to control air flow into the engine crankcase and provides a positive air pressure signal, especially at small throttle openings, to assist the metering of fuel within the fuel and air metering device. The positive air pressure signal is preferably provided by a small port in the engine air throttle body slightly downstream of the throttle valve and is communicated with the fuel and air metering device to cause additional fuel to be delivered from the device. This positive air pressure signal enhances the fuel metering especially at engine idle and low engine speeds when there is a very low flow of air through the open bore venturi of the fuel and air metering device and hence a low pressure differential created therein otherwise resulting in a small amount of fuel drawn through the device.

The fuel and air metering device has a main fuel nozzle through which fuel is drawn from a float bowl reservoir through a small fuel well into the open bore venturi where it is mixed with the inlet air flow through the venturi and delivered to the compressor for subsequent injection into the engine. The positive pressure air signal is preferably communicated with the fuel well surrounding the fuel nozzle to increase the fuel flow through the fuel nozzle at engine idle and low engine speeds. A fuel shut off valve may be positioned upstream of the main fuel nozzle and closed by a vacuum signal provided from a port in the engine air throttle body during engine overrun or deceleration wherein the engine is operating at high speeds but under low loads, and hence, has a low fuel demand.

The engine air throttle body and the fuel and air mixing device can be easily incorporated on engines using an auxiliary compressor or other similar means to pressurize the fuel and air mixture and directly inject that mixture into the cylinder of the engine. The engine air throttle body may utilize the existing conventional engine air throttle linkage for controlling air flow into the engine crankcase. The fuel and air mixing device uses an unrestricted or open venturi bore to meter fuel based on air flow through the venturi without the need for a throttle plate, slide, piston valve or other such air control device to allow unrestricted air flow into the compressor at all engine speeds without the added complexity of secondary throttle linkages for air flow synchronization between the engine air throttle body and the fuel and air mixing device. Further, the system is easily calibrated for use on engines of various sizes and for use over the wide range of engine speeds and loads experienced by individual engines.

Objects, features and advantages of this invention include providing a mechanical fuel and air mixing and delivery system which supplies the total engine fuel requirements through an auxiliary compressor or other means for pressurizing the mixture and injecting it into the engine cylinder, is readily adaptable to various types of two stroke engines using an auxiliary compressor for fuel and air mixture pressurization and injection into the engine, is readily adaptable to engines of various sizes and for operating individual engines over a wide range of speed, load and other operating conditions, improves compressor efficiency, improves fuel economy, engine performance and engine starting, decreases exhaust emissions, utilizes the existing engine throttle linkage without the need for a secondary throttle linkage to synchronize the air flow between the engine throttle valve and the fuel and air mixing device, has a single fuel nozzle, is reliable, durable, of relatively simple design and economical manufacture and assembly, and has a long useful life in service.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
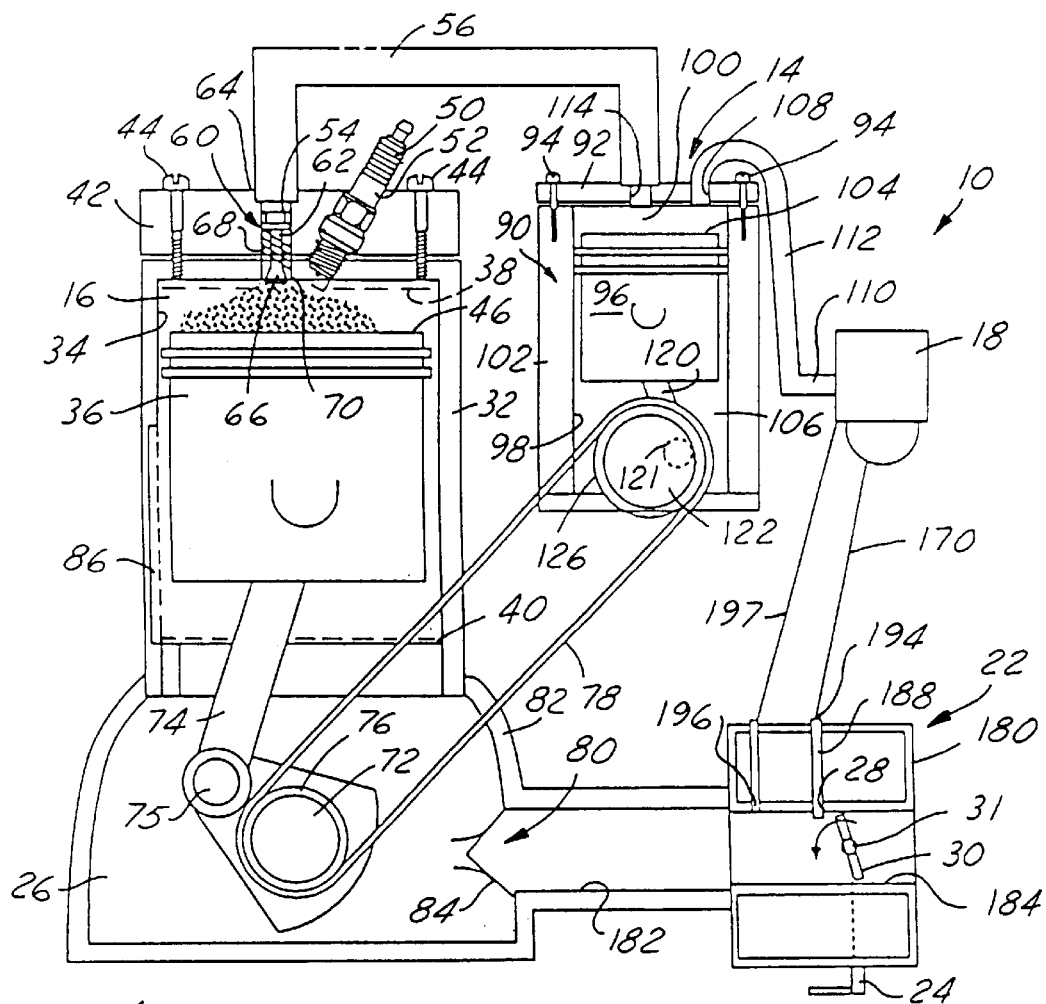
FIG. 1 is a diagrammatic view of an internal combustion, directly injected two stroke engine equipped with a fuel and air mixing and delivery system embodying this invention to deliver metered quantities of fuel and air to a compressor which pressurizes and subsequently injects the mixture into the engine cylinder.

Referring in more detail to the drawings, FIG. 1 illustrates a fuel and air mixing and delivery system 10 for a directly injected internal combustion two stroke engine 12 which provides a rich fuel and air mixture to a compressor 14 which pressurizes the mixture for subsequent injection directly into the combustion chamber 16 of the engine 12. A fuel and air mixing device 18 has an unrestricted open bore venturi 20 (FIG. 2) to draw fuel from the device 18 in response to air flow through the venturi 20 and to mix the fuel with the air flowing through the device 18 and deliver the mixture to the compressor 14. An engine air throttle body 22 uses a conventional engine throttle linkage 24 to actuate a valve plate 30 mounted on a pivot shaft 31 to control air flow into the engine crankcase 26 and provides a positive air pressure signal, especially at small throttle openings, to assist the metering of fuel within the fuel and air metering device 18. The positive air pressure signal is preferably provided by one or more small ports 28 in the engine air throttle body 22 downstream of a throttle valve 30 when it is in its closed position and is communicated with the fuel and air metering device 18 to cause additional fuel to be delivered from the device 18. This positive air pressure signal increases the quantity of fuel metered especially at engine idle and low engine speeds when there is a very low flow rate of air through the open bore venturi 20 of the fuel and air metering device 18 to thereby improve starting, engine idling and steady operation of the engine 12 at low speeds.

fuel and air mixing and delivery system 10 is preferably used with a two-stroke engine although the system may be adapted for use with four-stroke engines. The two stroke engine as shown, has a cylinder body 32 with a central bore 34 slidably receiving a piston 36 for linear reciprocation between first and second positions in the cylinder generally known as top dead center 38 and bottom dead center 40. A cylinder head 42 is secured adjacent the upper edge of the cylinder body 32 by several cap screws 44. The cylinder head 42 and cylinder body 32 may be joined in other ways such as by integrally forming them in a one piece casting. The combustion chamber 16 is defined between the upper face 46 of the piston 36, the cylinder body 32 and the cylinder head 42 and the crankcase chamber 26 is defined between the cylinder body 32 and the lower face of the piston 36. A spark plug 50 extends through an opening 52 in the cylinder head 42 and into the combustion chamber 16 and is preferably canted at an acute included angle to have its spark electrode ignition end disposed generally adjacent the center of the cylinder head 42. The cylinder head 42 has another opening 54 therethrough receiving a fluid conduit 56 through which the rich fuel and air mixture is delivered to the combustion chamber 16. The fluid conduit 56 is preferably a metal or polymeric tube, such as a nylon tube, with an internal diameter of about 0.050 inch to 0.250 inch.

A differential pressure injection valve 60 is disposed adjacent the cylinder head 42 and selectively communicates the fluid conduit 56 with the combustion chamber 16. The differential pressure injection valve 60 has a valve stem 62 received in an annular retainer 64 adjacent one end and preferably a frustoconical valve head 66 adjacent its other end to promote dispersion of the fuel and air mixture that flows through the valve 60. A spring 68 engages the retainer 64 to bias the valve 60 to a closed position with the valve head 66 firmly engaging a valve seat 70 of the cylinder head 42 thereby preventing flow of the fuel and air mixture into the combustion chamber 16.

The forces acting on the injection valve 60 to open and close it are the spring force, the pressure within the combustion chamber 16 and the pressure within the fluid conduit 56. The pressure of the fuel and air mixture adjacent the differential pressure injection valve 60 can vary between about 30 psi to 160 psi. Pressures less than 30 psi result in too low a velocity of the mixture injection which causes fuel particle coalescence and loss of mixture atomization and injection pressures greater than 160 psi significantly impact stability of the fuel and air mixture flow. A suitable injection valve is disclosed in pending U.S. patent application Ser. No. 08/865,787, the disclosure of which is incorporated herein by reference in its entirety.

The crankcase chamber 26 houses a crankshaft 72 which is powered to rotate by reciprocation of the piston 36 through a connecting rod 74 pivotally connected to the piston 36 at one end and journalled for rotation on a crank or throw 75 of the crankshaft 72 at its other end. A cog pulley 76 is operably connected to the crankshaft 72 for corotation therewith and is constructed to receive and drive a power transmission member 78 such as a timing belt or chain. An air inlet 80 is provided in a sidewall 82 of the crankcase 26 and has a valve 84 such as a reed valve, rotary valve, rotary disc, slide valve, check valve, or a piston port configuration therein to selectively permit air flow therethrough. The valve 84 permits flow into and prohibits flow out of the crankcase 26. To communicate the air in the crankcase 26 with the combustion chamber 16 a transfer passage 86 is located in the engine cylinder body 32 extending into the crankcase 26 and selectively communicated with the combustion chamber 16 by the piston 36. When the piston 36 moves adjacent its bottom dead center position 40 in the cylinder the transfer passage 86 is opened to the combustion chamber 16 and air flows from the crankcase 26 into the combustion chamber 16 to provide fresh air into the combustion chamber 16 and to help purge or scavenge exhaust gases from the combustion chamber 16. Subsequent piston 36 travel away from the bottom dead center 40 position and toward the top dead center position 38 closes the transfer port 86 to prevent air flow therethrough.

The compressor 14 comprises a secondary cylinder having a body 90, a cylinder head 92 attached to the cylinder body 90 by cap screws 94 and a piston 96 slidably received for linear reciprocation within a cylindrical bore 98 in the body 90. The compressor 14 may be mounted exteriorly of the engine cylinder body 32 or the two cylinder bodies 32, 90 may be joined together or integrally formed. A compression chamber 100 is defined between the cylinder head 92, a sidewall 102 of the body 90 and the upper face 104 of the piston 96. Adjacent the opposite side of the piston 96 a crankcase chamber 106 is defined with the cylinder body 90, sidewall 102 and the piston 96. An inlet port 108 through the cylinder head 92 communicates with an outlet 110 of the fuel and air metering device 18 through a suitable conduit 112. An outlet port 114 formed through the cylinder head 92 communicates with the combustion chamber of the engine through the fluid conduit 56 and injection valve 60.

To control the flow of the fuel and air mixture from the compressor 14 a compression relief valve (not shown) may be disposed within the fluid conduit 56 adjacent to the outlet 114 of the compressor 14 and in communication with the compression chamber 100. The compression relief valve enables a first stage of pressure control of the fluid discharged from the compressor 14 with a second stage of pressure control provided by the differential pressure injection valve 60 controlling the flow of the fuel and air mixture into the combustion chamber 16 of the engine 12. This dual stage approach may provide improved system response and increased mixture flow through the differential pressure injection valve 60.

A connecting rod 120 is pivotally connected to the compressor piston 96 adjacent one end and adjacent its opposite end is journalled for rotation on a throw or crank pin 121 of a crankshaft 122 of the compressor 14. A cog pulley 126 is keyed to the crankshaft 122 for corotation therewith and is constructed to receive the power transmission cog belt 78 received on the cog pulley 76 of the engine cylinder 32 for corotation therewith. The pulleys 76, 126 preferably have the same effective diameter so that the piston 96 of the compressor 14 is driven at a one-to-one ratio with the piston 36 of the engine 12 to maintain synchronization of operation of the engine 12 and compressor 14 for each engine cycle.

Figure 2:
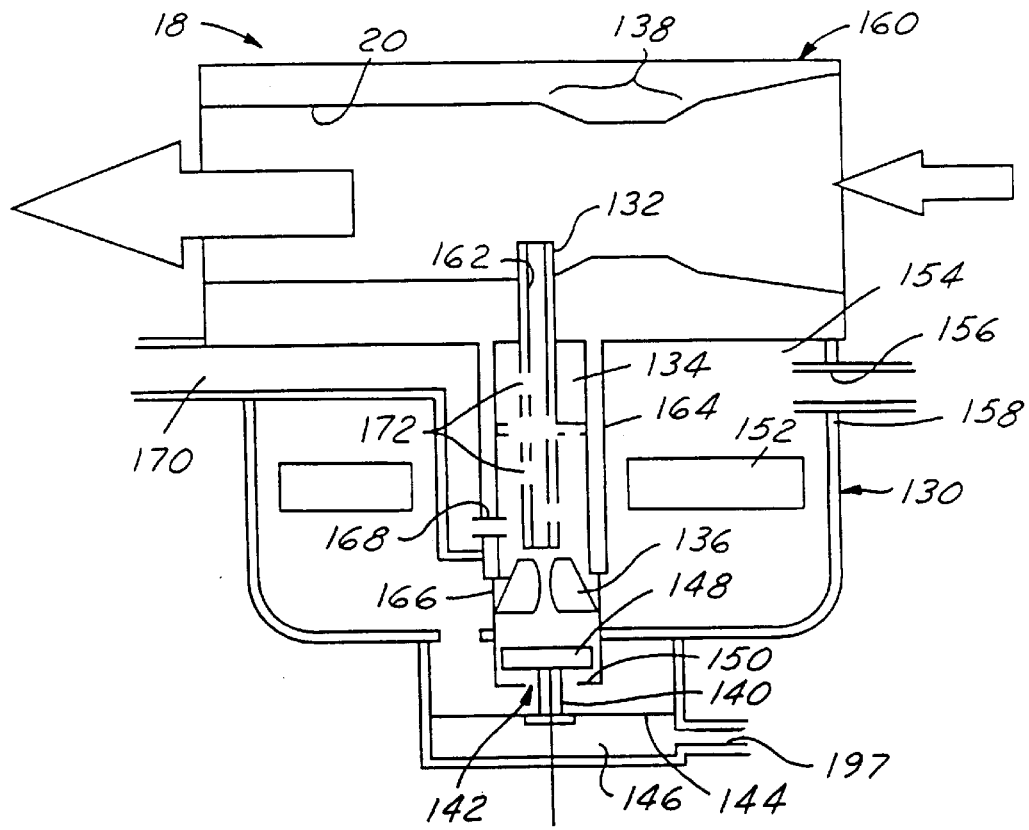
FIG. 2 is a diagrammatic sectional view of a fuel and air mixing device of the system of FIG. 1.
Figure 5:
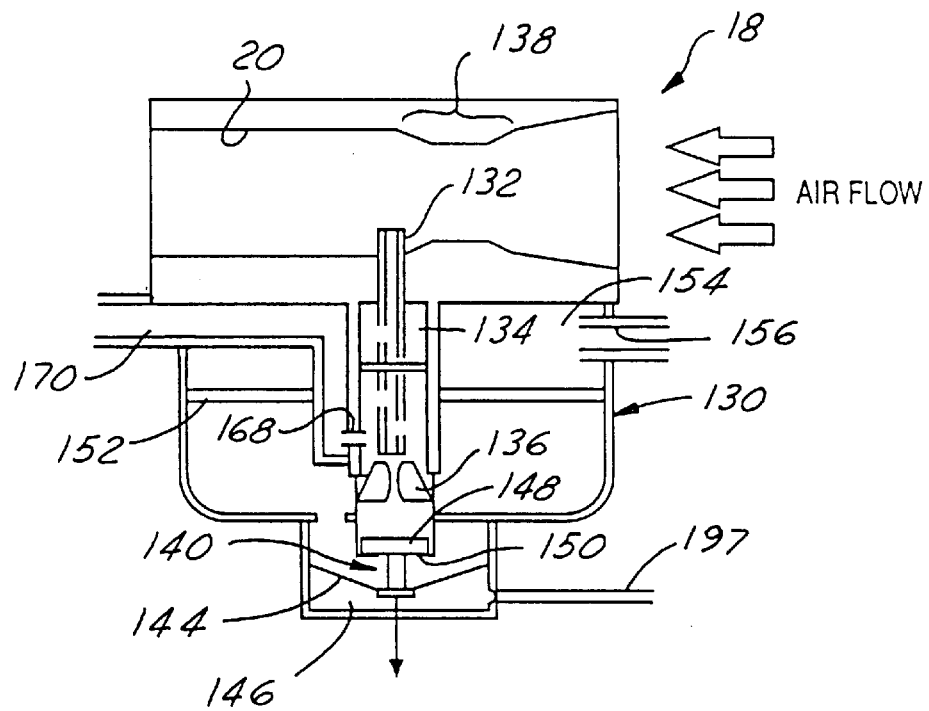
FIG. 5 is a diagrammatic view of the fuel and air mixing device of FIG. 2 with a fuel shutoff valve shown in a closed position.

The fuel and air metering device 18 is constructed to deliver to the compressor 14 a rich fuel and air mixture having a sufficient quantity of fuel to satisfy the total fuel demand of the engine 12. As shown in FIG. 2, the fuel and air metering device 18 has an open bore 20 communicating with a fuel bowl 130 through a fuel nozzle 132 received in a fuel well 134 into which fuel is drawn through a main fuel jet 136 from the fuel bowl 130. An annular float 152 received around the fuel well 134 is buoyant in liquid fuel in the fuel bowl 130 and controls the admission of fuel into the fuel bowl from a needle valve (not shown) to maintain a sufficient level of fuel in the fuel bowl as fuel is consumed by the engine. On its other face, the float 152 communicates with an air space 154 which is communicated with the atmosphere through a vent port 156 in the sidewall 158 of the fuel bowl 130. A reduced diameter portion or venturi throat 138 is preferably formed in the bore 20 to increase the pressure drop across the fuel nozzle 132 when air flows through the venturi 138, although in some applications a straight bore may be used. A fuel shutoff valve 140 may be provided adjacent the inlet 142 of the well 134 to selectively permit fuel flow into the well 134 from the fuel bowl 130. The fuel shutoff valve 140 is preferably carried by a flexible diaphragm 144 which separates a vacuum chamber 146 from the fuel in the fuel bowl 130. When a sufficient pressure differential exists across the diaphragm 144 tending to displace the diaphragm 144 downwardly, as shown in FIG. 5, an enlarged valve head 148 of the fuel shutoff valve 140 engages an annular valve seat 150 of the fuel well 134 to close the inlet 142 to the fuel well 134 and prevent further fuel flow into the well.

The open bore 20 is formed through an upper body 160 connected to the fuel bowl 130 to close the upper end of the fuel bowl 130. The body 160 has an opening 162 through which the fuel nozzle 132 is press fit or otherwise securely received to position the nozzle 132 within the bore 20 downstream of the venturi 138. In assembly, a depending skirt 164 of the upper body 160 and a cylindrical portion 166 of the fuel bowl 130 define the fuel well 134 when the body 160 and fuel bowl 130 are joined. A port 168 through the depending skirt 164 communicates with an air passage 170 formed in the fuel bowl 130. A plurality of small openings 172 are formed in the portion of the fuel nozzle 132 received in the fuel well 134 through which fuel or air in the fuel well may enter the fuel nozzle 132.

As shown in FIG. 1, the engine air throttle body 22 comprises a housing 180 disposed adjacent an air inlet passage 182 of the engine crankcase 26 and having an air flow passage 184 communicating therewith and a conventional engine air throttle valve 30 fixed on pivot shaft 31 and controlling the flow of air through the air flow passage 184. The throttle valve 30 has a closed position, substantially transverse to the flow of air through the air flow passage 184 to substantially prevent the flow of air through the passage 184 and a wide or full open position, generally parallel to the flow of air through the air flow passage 184, permitting a substantially free flow of air therethrough. The throttle valve 30 may be connected to a conventional engine throttle linkage 24 to control the flow of air through the engine air throttle body 22 and into the engine crankcase 26. If the system 10 is retrofitted to an existing conventional engine, its existing throttle linkage may be used.

Figure 6:
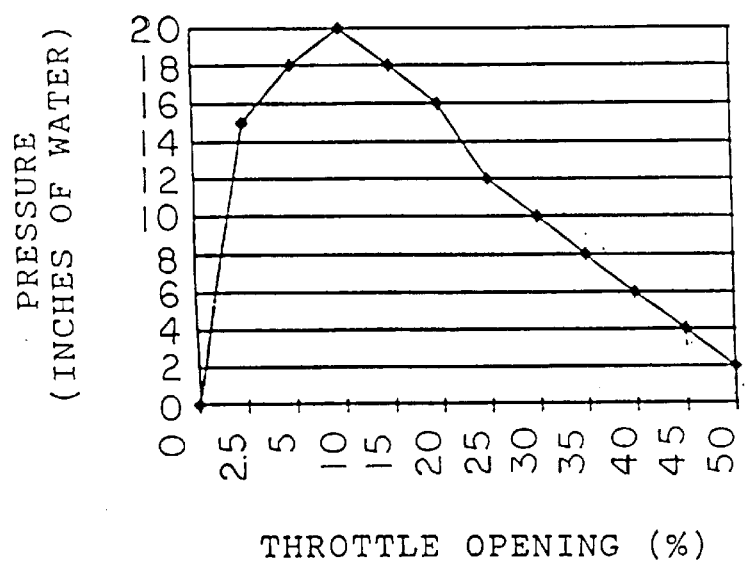
FIG. 6 is a plot of the magnitude of an air pressure signal according to throttle valve position for an engine air throttle body constructed according to FIG. 3.
Figure 3:
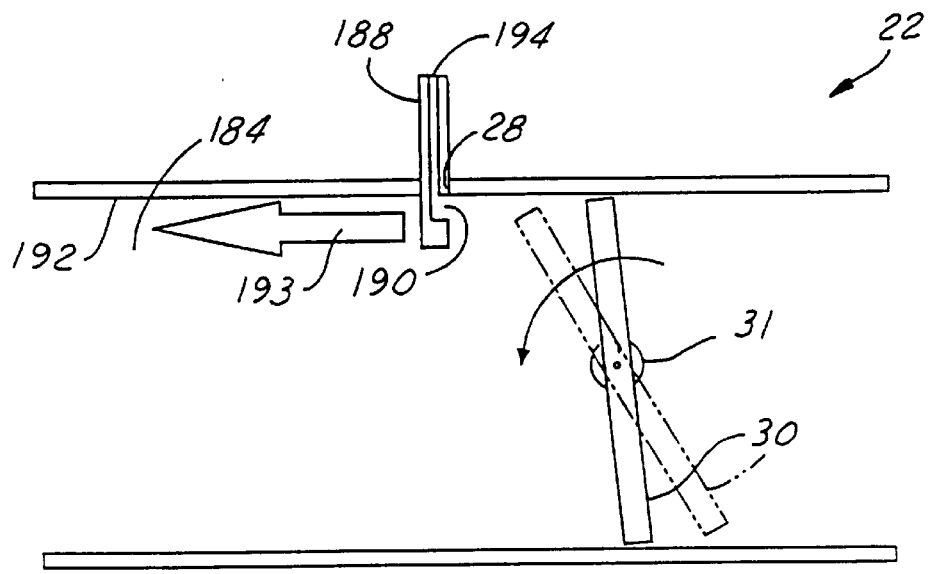
FIG. 3 is a partial sectional view of an engine air throttle body of the system of FIG. 1.

As shown in FIGS. 1 and 3, a small port 28 is formed in the air flow passage 184 slightly downstream of the throttle valve 30 when in its closed position. Preferably, a pitot tube 188 is disposed in the port 28 with its side opening 190 preferably located generally adjacent the wall 192 of the air flow passage 184 and opening upstream toward the throttle valve 30 to communicate with the localized high velocity air flow (indicated by the arrow 193) through the throttle valve 30 at small throttle openings. The passage 194 of the pitot tube 188 communicates with the fuel well 134 through the passage 170 in the fuel bowl 130 and the port 168 through the depending skirt 164 of the upper body 160 to provide a positive pressure air signal to the fuel well 134. As shown in FIG. 6, the pitot tube 188 is constructed and arranged to provide a relatively high pressure air signal when the throttle valve 30 is adjacent its closed position, such as when the throttle valve 30 is between 2% and 30% open, and provides a diminishing pressure signal between throttle valve openings of 30% to 50% with a minimal pressure signal provided between 50% throttle valve opening and the fully open position of the throttle valve 30.

A vacuum port 196 formed in the passage 184 downstream of the throttle valve and upstream of the crankcase chamber 26 communicates with the vacuum chamber 146 of the fuel and air metering device 18 through a conduit 197 to displace the diaphragm and close the fuel shutoff valve 140 during engine overrun or engine deceleration or other engine operating conditions when the engine 12 is operating at high speeds under low loads and requires a lesser amount of fuel and thus the throttle valve is substantially closed. Under these engine operating conditions, a vacuum is generated within the engine crankcase 26 and is communicated through the vacuum port 196 of the engine air throttle body 22 with the vacuum chamber 146 to displace the diaphragm 144 to close the valve 142, as shown in FIG. 5, and thereby prevent additional fuel from being drawn into the fuel well 134 from the fuel bowl 130.

Figure 4:
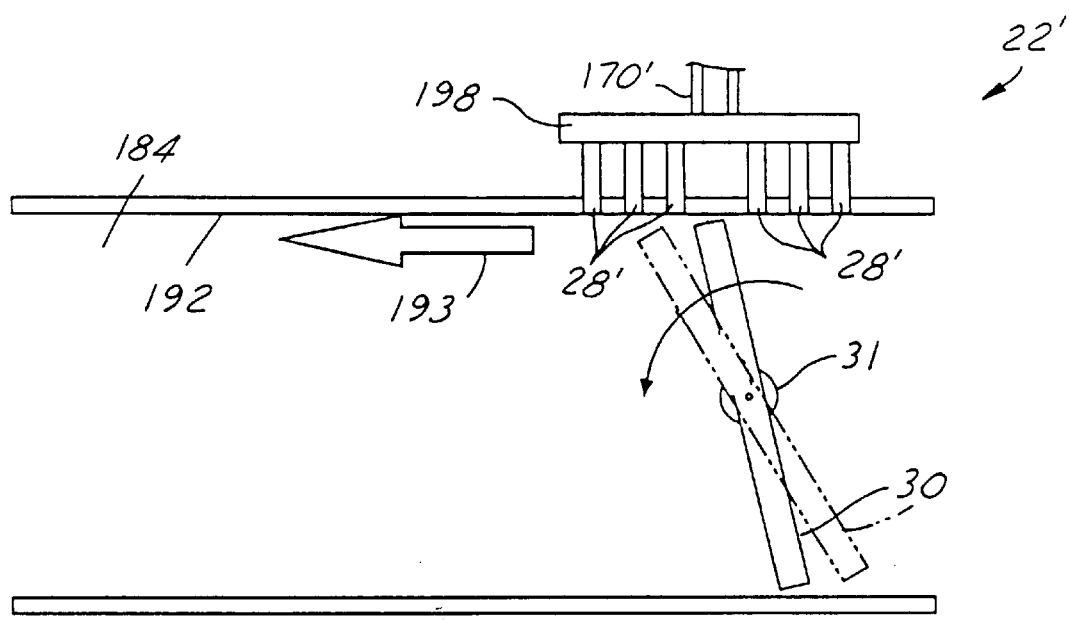
FIG. 4 is a partial sectional view of an alternate embodiment of an engine air throttle body which may be used with the system of FIG. 1.

As shown in FIG. 4, in an alternate embodiment of the engine air throttle body 22', a plurality of ports 28' may be provided adjacent the throttle valve 30, instead of the pitot tube 188, with at least one port 28' positioned slightly downstream of the throttle valve 30 when in its closed position. The plurality of ports 28' are constructed and arranged to provide the positive pressure air signal in a similar manner to the pitot tube 188 of the engine air throttle body 22 such that at throttle valve positions between 2% and 30% open a relatively high pressure signal is provided with a diminishing signal between 30% and 50% throttle valve opening and a minimal pressure signal provided thereafter. Each of the plurality of ports 28' is connected by a manifold 198 to communicate with the fuel well 134 through a single passage 170'.

OPERATION

The fuel and air mixture in the combustion chamber 16 of the engine 12 is ignited by the spark plug 50 and the subsequent combustion of the fuel drives the engine piston 36 for reciprocation in the engine cylinder 32. The reciprocating piston 36 rotates the crankshaft 72 which drives the compressor crankshaft 122 via the belt 78 linking the pulleys 76, 126.

The rotating compressor crankshaft 122, as driven by the engine crankshaft 72, drives the compressor piston 96 for reciprocation within the compressor cylinder body 90. The reciprocating compressor piston 96 creates a pressure drop on its downstroke (when the compressor piston 96 moves from its top dead center position towards its bottom dead center position) which draws the rich fuel and air mixture from the fuel and air metering device 18 through the inlet port 108 and into the compression chamber 100 of the compressor 14. As the compressor piston 96 moves from its bottom dead center position to its top dead center position the rich fuel and air mixture in the compression chamber 100 is pressurized and delivered through the fluid conduit 56 to the differential pressure injection valve 60 for injection into the engine combustion chamber 16.

The metering of fuel from the fuel and air metering device 18 is assisted by the pressure drop created by the reciprocating compressor piston 90 which draws air through the open bore 20 and venturi 138 of the device 18. Air flow through the venturi 138 creates a pressure drop downstream of the venturi 138 which communicates with the open end of the fuel nozzle 132 in the open bore 20. Upon sufficient air flow rates through the venturi 138, a sufficient pressure differential is generated across the nozzle 132 to draw enough fuel from the fuel bowl 130, through the main jet 136, into the fuel well 134 and through the fuel nozzle 132 to satisfy the total fuel demand of the engine 12. Fuel discharged from the fuel nozzle 132 is mixed with the air flowing through the open bore 20 and delivered to the compression chamber 100 of the compressor 14 as a rich fuel and air mixture.

The rich fuel and air mixture has a higher fuel to air ratio than is ideal for combustion and typically, the fuel to air ratio of the mixture supplied to the compressor 14 is in the range of about 1:2 to 1:12.5 fuel to air. Currently preferred fuel to air ratios for combustion are in the range of 1:12 to 1:18. To bring the rich fuel and air mixture delivered from the compressor 14 to the combustion chamber 16 of the engine 12 into the preferred range for combustion, additional air is supplied to the combustion chamber 16 from the engine crankcase 26 through the transfer passage 86 in the engine cylinder 32 when the transfer passage 86 is open. Injecting the rich fuel and air mixture is desirable because it allows a sufficient quantity of fuel to be injected over a short injection time which improves control over the injection event to improve fuel economy and reduce emissions from the engine 12.

The throttle valve 30 of the engine air throttle body 22 is coupled to the engine throttle linkage 34 to control air flow into the crankcase 26 in response to engine operating conditions. For ease of description, the throttle valve 30 position will be described in terms of a percentage of its fully open position with a 0% throttle valve opening equal to the fully closed position substantially preventing air flow through the passage 184 and a 100% open throttle valve position equal to its fully open position permitting a substantially unrestrictive flow of air through the passage 184.

At engine idle, or other engine operating conditions when the engine 12 is operating at a low speed and under low loads, the throttle valve 30 is only slightly open or is open a small percentage (2–15%) compared to its fully open position. At such engine operating conditions, the compressor 14 is driven at a low speed and hence, does not generate a significant pressure drop resulting in a low air flow rate through the venturi 138 of the fuel and air metering device 18. The low air flow rate through the open bore venturi 138 results in a small differential pressure across the fuel nozzle 132 and an insufficient fuel draw through the nozzle 132 for operation of the engine 12. To increase the fuel flow rate through the fuel nozzle 132, the positive pressure air signal from the port 28 and pitot tube 188 of the engine air throttle body 22 is applied to the fuel well 134 through the passage 170 to force fuel and the air through the fuel nozzle 132 and into the bore 20. As noted earlier, the positive pressure air signal is greatest at very small throttle valve 30 openings and is preferably negligible beyond throttle valve openings of about 50%. As shown in FIG. 6, in one pitot tube 188 construction and arrangement, throttle positions between about 2.5% to 25% open, provide a positive pressure signal of about between 10 to 30 inches of water. Throttle valve positions of about between 25% to 50% open provide a generally steady decline in the pressure of the air signal to a pressure of less than 5 inches of water at throttle openings of about 50% with a negligible pressure signal provided between 50% and 100% throttle valve openings. These figures are representative only; the magnitude of the pressure signal will vary in different applications and can be calibrated as desired.

During engine overrun or deceleration conditions when the engine 12 is operating at high speed but has a low fuel demand, a significant vacuum is developed in the engine crankcase 26 which is communicated through the passage 184 with the vacuum port 196 of the engine air throttle body 22. The vacuum port 196 communicates the vacuum with the vacuum chamber 146 to displace the diaphragm 144 and actuate the fuel shutoff valve 140, as shown in FIG. 5, to prevent additional fuel from being drawn into the fuel well 134. This greatly reduces engine exhaust emissions under these deceleration conditions. This also reduces hydrocarbon vapor emissions from the fuel and air metering device 18.

Thus, the fuel and air metering device 18 and the engine air throttle body 22, in combination, provide a metered fuel and air mixture to the compressor 14 corresponding to the engine's fuel demand from engine starting and idling, to wide open throttle operating conditions where the engine 12 has its maximum fuel demand. The positive pressure air signal provided by the ports 28, 28' in the engine air throttle body 22 can be adjusted and calibrated to strategically provide the air pressure signal to increase the delivery of fuel from the fuel and air metering device 18 to the appropriate quantity of fuel for the steady operation of the engine 12. Further, the fuel and air metering device 18 and engine air throttle body 22 can be readily adapted to various engines ranging from very small, hand-held lawn and garden tool engines up to engines of 500 cc's or more. The relatively simple fuel and air mixing and delivery system 10 can be implemented at a low cost to existing engines and provides improved fuel economy, compressor efficiency, engine starting and engine performance over a wide range of operating conditions.

We claim:

1. A fuel and air delivery system for a fuel injected, two stroke internal combustion engine having a crankcase chamber, a combustion chamber and a transfer passage communicating the crankcase chamber with the combustion chamber during a portion of the engine's stroke comprising:

a compressor driven by the engine to pressurize a rich fuel and air mixture therein and deliver the rich mixture under pressure to the combustion chamber of the engine to which air is delivered from the crankcase chamber to support combustion of the fuel;

a fuel and air metering device having a fluid passage with an inlet through which air flows into the fuel and air metering device and an outlet communicating with the compressor, a fuel supply reservoir, a fuel inlet through which fuel is drawn into the fuel supply reservoir, and a fuel nozzle in communication with the fuel reservoir and with the fluid passage downstream of the inlet to draw fuel from the fuel supply reservoir and deliver it into the fluid passage in response to air flowing through the fluid passage and to mix the fuel with the air flowing through the fluid passage to deliver the rich fuel and air mixture to the compressor;

an engine air throttle body having a housing, an air passage through the housing with an inlet through which air flows into the housing and an outlet through which air flows into the engine crankcase chamber, a throttle valve disposed within the passage and moveable from a fully open position permitting a substantially unrestricted flow of air through the passage to a fully closed position at least substantially restricting the flow of air through the passage and into the engine crankcase and at least one air outlet port downstream of the throttle valve when in its closed position and communicating with the fuel nozzle of the fuel and air metering device whereby each outlet port provides a positive pressure air signal to the fuel and air metering device which varies in response to the position of the throttle valve to vary the fuel discharged from the fuel nozzle to correspond to the engine fuel demand.

2. The system of claim 1 which also comprises a reduced diameter venturi portion of the fluid passage downstream of the inlet and constructed to provide a pressure drop across the fuel nozzle.

3. The system of claim 1 wherein the pressure at each of the at least one air outlet ports is greatest when the throttle valve is nearer its fully closed position than its fully open position.

4. The system of claim 3 wherein the fully open throttle position is designated as 100% open and the fully closed position is designated as 0% open and the pressure at each air outlet port combined is greatest between throttle positions of about 2.5% to 30% open.

5. The system of claim 4 wherein the maximum pressure of the air signal is between about 15 inches of water to 30 inches of water.

6. The system of claim 4 wherein at throttle positions between about 50% to 100% open the pressure of the air signal is less than about 5 inches of water.

7. The system of claim 1 wherein one air outlet port is provided and a pitot tube is disposed within the air outlet port having a side opening within the fluid passage and immediately adjacent a sidewall of the fluid passage and in communication with localized air flow around the throttle valve at very small throttle openings and an outlet communicating with the fuel and air metering device.

8. The system of claim 1 wherein a plurality of air outlet ports are provided, and a manifold communicates each air outlet port with a common outlet to provide the positive air pressure signal to the fuel and air metering device.

9. The system of claim 8 wherein at least one of the air outlet ports is disposed upstream of the throttle valve when in its closed position.

10. The system of claim 1 which also comprises a fuel shutoff valve in the fuel and air metering device constructed and arranged to selectively communicate the fuel reservoir with the fuel nozzle.

11. The system of claim 10 which also comprises a vacuum port formed in the engine air throttle body downstream of the throttle valve and upstream of the engine crankcase and constructed under certain engine operating conditions to close the fuel shutoff valve and prevent fuel flow from the fuel reservoir to the fuel nozzle.

12. The system of claim 11 which also comprises a diaphragm in the fuel and air metering device defining a vacuum chamber on one side and a portion of the fuel reservoir on its other side, the fuel shutoff valve is actuated by the diaphragm and the vacuum port communicates with the vacuum chamber to displace the diaphragm and close the fuel shutoff valve when a sufficient vacuum is generated at the vacuum port.

13. The system of claim 1 which also comprises a fuel well defined in the fuel and air metering device communicating with the fuel reservoir and the fuel nozzle and the positive pressure air signal is provided to the fuel well to increase the fuel discharged through the fuel nozzle.

14. The system of claim 13 which also comprises a plurality of openings in the fuel nozzle in communication with the fuel well through which air and fuel in the fuel well enter the fuel nozzle to be discharged into the fluid passage.

* * * * *